United States Patent
Kim

[19]

[11] Patent Number: 6,057,996
[45] Date of Patent: May 2, 2000

[54] LEAKAGE CURRENT ALARMING/BLOCKING APPARATUS USING ANTIPHASE TRANSFORMER

[75] Inventor: JungMoo Kim, Buchon-Shi, Rep. of Korea

[73] Assignee: Dong Yang Hi-Tec Co., Ltd., Rep. of Korea

[21] Appl. No.: 09/195,821

[22] Filed: Nov. 19, 1998

[30] Foreign Application Priority Data

Dec. 30, 1997 [KR] Rep. of Korea ...................... 97-77493

[51] Int. Cl.[7] ...................................................... H02H 3/00
[52] U.S. Cl. ................................ 361/42; 361/45; 361/58; 361/115
[58] Field of Search .................................. 361/42, 45, 49, 361/58, 115

[56] References Cited

U.S. PATENT DOCUMENTS

| | | | |
|---|---|---|---|
| 4,712,154 | 12/1987 | Madsen | 361/42 |
| 4,791,519 | 12/1988 | Madsen | 361/42 |
| 4,799,124 | 1/1989 | Taylor et al. | 361/42 |
| 4,829,390 | 5/1989 | Simon | 361/49 |
| 4,951,169 | 8/1990 | Morse | 361/42 |
| 4,967,308 | 10/1990 | Morse | 361/42 |
| 5,099,212 | 3/1992 | Nagaishi | 324/508 |
| 5,109,315 | 4/1992 | Morse | 361/42 |
| 5,151,841 | 9/1992 | Knights | 361/86 |

*Primary Examiner*—Stephen W. Jackson
*Attorney, Agent, or Firm*—Fish & Richardson P.C.

[57] ABSTRACT

A leakage current alarming/blocking apparatus using an antiphase transformer for detecting the leakage of current from an electric appliance. The apparatus includes an antiphase transformer having an AC from a secondary side of a transformer which are antiphased with respect to a ground potential, a virtual ground unit connected with an output terminal of the antiphase transformer for forming a virtual ground potential, an electric appliance conductive material formed on a surface of an electric appliance connected with the virtual potential of the virtual ground unit, a leakage current detector for repeatedly detecting whether the current is leaked from the electric appliance conductive material and outputting a signal indicating that the current is being leaked, an electric power controller for blocking the supply of the electric power when the signal indicating the leakage of the current is input, an alarming signal generator for outputting an alarming signal when the signal indicating the leakage of the current is input from the leakage current detector, and a DC supply unit for converting the AC into the DC and applying the DC to the leakage current detector, the electric power controller, and the alarming signal generator, respectively, thereby preventing an electric shock by detecting and blocking the leakage current and displaying the same on the visual and audible signal display units.

18 Claims, 6 Drawing Sheets

LEAKAGE CURRENT ALARMING/BLOCKING APPARATUS USING ANTIPHASE TRANSFORMER

BACKGROUND OF THE INVENTION

1. Field of the Invention

The present invention relates to an electrical safety apparatus which is capable of detecting leakage current from an electric appliance and blocking the current from being applied to an electric appliance, and in particular, but not exclusively, to an improved leakage current alarming/blocking apparatus which is capable of effectively preventing an electric shock by detecting a leakage current of an electric appliance such as a washing machine, refrigerator, microwave oven, motor, electric heater, etc. using an antiphase transformer in which the AC (Alternating Current) of a secondary side of a transformer is antiphased based on a ground potential, blocking electric power from being applied to the electric appliance to prevent an electric shock to a user.

2. Description of the Conventional Art

Generally, an electric appliance such as washing machine, refrigerator, microwave oven, motor, electric heater, etc. is housed with a conductive material such as a steel plate. Therefore, if a leakage current is applied to the surface of the above-described electric appliance, a user may experience an electric shock when in contact with the exposed portion of the electric appliance.

In order to overcome the above-described problems, there are a few known methods. First, the surfaces of the product are coated with a non-conductive material (for example, paint). The non-conductive material provides insulation between the user and the surface of the appliance. If there is any leakage current in the surface, the user will not become part of the circuit and experience an electric shock. Second, a ground terminal is installed and then connected with a ground potential (or a ground terminal having a ground potential) through a ground cable. The ground cable is connected to the ground potential. If there is any leakage current present in the surface of the appliance, it will flow to the ground potential. The user avoids an electric shock by not becoming the ground terminal. Third, the electric appliance is supplied with an electric power through a circuit breaker. The circuit breaker blocks any leakage current.

However, among the above-described electric shock prevention methods, there are some problems. Namely, in the first method, when the coated non-conductive material is exposed due to scratch, abrasion, impact, etc., the user may come into contact with the exposed portion and receive an electric shock. In addition, in the second method, the conductive material of the product may not be connected with the ground potential due to an installation error by a user or simply by an accidental disconnection. For example, a ground cable is extended from the product at a predetermined length and is connected with the ground potential. If the installation site of the product is far from the ground potential, it is impossible to connect the ground cable with the ground potential, and the connection is never made.

Microwave ovens or refrigerators are generally installed in the kitchen, and washing machines are installed in places where there are few taps. The above-described places are remote from ground, so that it becomes virtually impossible to ground electric appliances. In addition, in some buildings, the ground port of a three-port wall outlet is not grounded. Therefore, the ground line extended from the ground terminal of the electric appliance is not grounded.

The third method for applying electric power to the electric appliance through the circuit breaker also has problems. When a human body contacts with an electric appliance which is electrically exposed, a closed loop of "Electric power supplying terminal→Conductive material of electric appliance→Human body→Ground" is formed. When current flowing in the human body exceeds a heart beating rate of 50 mA per second, the human body is electrically shocked. Therefore, the circuit breaker is generally designed to have an electric shock current of below 30 mA and an operation time of below 0.1 seconds. However, when applying an electric power using the abovedescribed circuit breaker, the following problems may occur. First, it is impossible to detect the leakage current when the electric appliance is not grounded. Second, since the electric appliance is grounded using the ground terminal and line, if the electric line connected with the electric appliance is cut or electric power supplied to the electric appliance is turned on or off, it would become impossible to detect the leakage current.

In the conventional circuit breaker for the leakage current, the amount of the current applied through the circuit breaker and the amount of the current fed back through the closed loop are detected. If it is determined that the two current values are different, it is concluded that there is leakage current. If there is a situation where the electric lines to the appliance are cut, no leakage current will flow and therefore not be detected. So even if there is leakage current, it will not be detected therefore exposing a user to a potential shock.

SUMMARY OF THE INVENTION

The present invention provides a leakage current alarming/blocking apparatus using an antiphase transformer which overcomes the aforementioned problems encountered in the conventional art.

The present invention also provides a leakage current alarming/blocking apparatus using an antiphase transformer which is capable of detecting a leakage current without grounding the electric appliance. The apparatus forms a virtual ground unit at a secondary output terminal of an antiphase transformer and connects a conductive material formed on the surface of the electric appliance to the virtual ground unit. It is capable of blocking the electric power from being supplied to the electric appliance and alarming the leakage current to an operator when there is leakage current.

The leakage current alarming/blocking apparatus includes an antiphase transformer having an AC (Alternating Current) from a secondary side of a transformer which is antiphased with respect to a ground potential, a virtual ground unit connected with an output terminal of the antiphase transformer for forming a virtual ground potential, and an electric appliance conductive material formed on a surface of an electric appliance connected with the virtual potential of the virtual ground unit. There is also a leakage current detector for repeatedly detecting whether the current leaking from the electric appliance conductive material, and emitting a signal indicating that the current is leaking, an electric power controller for blocking the supply of the electric power when the signal indicating the leakage of the current is detected, and an alarming signal generator for sounding alarm when the leakage current signal is detected from the leakage current detector. Finally there is a DC (Direct Current) supply unit for converting the AC into the DC and applying the DC to the leakage current detector, the electric power controller, and the alarming signal generator, respectively.

The virtual ground unit includes a first resistor and a second resistor which are connected in series and a common terminal between them. The first and second resistors are in parallel with the output terminal of the secondary side of the anti-phase transformer. The common connection terminal between the first resistor and the second resistor becomes a virtual ground potential having a ground potential.

The virtual ground unit can also include a first condenser and a second condenser which are connected in series, and a common terminal between them. The first and second condensers are in parallel with the output terminal of the secondary side of the antiphase transformer. The common connection terminal between the first condenser and the second condenser becomes a virtual ground potential having a ground potential.

The leakage current detector includes a resistor connected between the electric appliance conductive material and the virtual ground unit for forming an electric potential when the current is leaked from the electric appliance conductive material, and an optical switching means having a LED (Light Emitting Device) connected in parallel with the resistor through a protection resistor and a light receiving unit connected with a positive (+) potential from the DC supply unit for outputting a voltage or a current proportional to the amount of light from the light LED when an electric potential difference occurs in the resistor.

The leakage current detector includes a resistor connected between the electric appliance conductive material and the virtual ground unit for forming an electric potential when the current is leaked from the electric appliance conductive material, an optical switching means having a LED connected in parallel with the resistor through a protection resistor and a light receiving unit connected with a positive (+) potential from the DC supply unit for outputting a voltage or a current proportional to the amount of light from the LED when an electric potential difference occurs in the resistor, and a comparing means for comparing a voltage or a current from the optical switching means with a previously set reference value and outputting a predetermined signal when the voltage or current from the optical switching means exceeds the reference value.

The leakage current detector includes a resistor connected between the electric appliance conductive material and the virtual ground unit for forming an electric potential when the current is leaked from the electric appliance conductive material, and an optical switching means having a LED connected in parallel with the resistor through a protection resistor and a light receiving unit connected with a positive (+) potential from the DC supply unit for outputting a voltage or a current proportional to the amount of light from the light LED when an electric potential difference occurs in the resistor, and an amplifying means for amplifying the voltage or current from the optical switching means and outputting the same.

The leakage current detector includes a resistor connected between the electric appliance conductive material and the virtual ground unit for forming an electric potential when the current is leaked from the electric appliance conductive material, and an optical switching means having a LED connected in parallel with the resistor through a protection resistor and a light receiving unit connected with a positive (+) potential from the DC supply unit for outputting a voltage or a current proportional to the amount of light from the light LED when an electric potential difference occurs in the resistor, an amplifying means for amplifying the voltage or current from the optical switching means and outputting the same, and a comparing means for comparing a voltage or a current from the amplifying means with a previously set reference value and outputting a predetermined signal when the voltage or current from the optical switching means exceeds the reference value.

The leakage current detector includes a resistor connected between the electric appliance conductive material and the virtual ground unit for forming an electric potential when current leaks from the electric appliance conductive material. In parallel with the potential forming resistor is a Light Emitting Diode (LED) in series with a protective resistor, forming an optical switching means. Near the LED is a light receiving unit connected with a positive (+) potential from the DC supply unit. The positive potential will output a voltage or a current proportional to the amount of light from the LED when an electric potential difference occurs in the resistor. There is an amplifying means for amplifying the voltage or current from the optical switching means. The leakage current detector also includes a comparing means for comparing a voltage or a current from the amplifying means with a previously set reference value and generating a predetermined signal when the voltage or current from the optical switching means exceeds the reference value.

The electric power controller includes a relay connected with the electric power input terminal of the electric appliance. It is operated in accordance with a control signal for blocking the supply to the electric appliance, and a switching means operated in accordance with a signal from the leakage current detector for controlling the operation of the relay.

The alarming signal generator includes a visual signal display unit operated in accordance with a signal from the leakage current detector. It displays the leakage of the current, and sounds an audible signal in accordance with a signal from the leakage current detector, indicating the leakage of the current.

The DC supply unit is formed of a rectifying circuit using a double insulation transformer.

The rectifying circuit includes a double insulation transformer, a bridge radio rectifying circuit connected with a secondary side of the double insulation transformer for rectifying the AC. There is also a zenor diode connected in parallel with a radio signal output terminal of the bridge radio rectifying circuit for limiting the voltage from the bridge radio rectifying circuit below a predetermined value. There is also smoothing condenser connected in parallel with the zenor diode for smoothing the voltage from the zenor diode.

The leakage current alarming/blocking apparatus according to the present invention is directed to preventing an electric shock by forming a virtual ground unit having a ground potential using a characteristic of an antiphase transformer. The characteristics of the antiphase transformer connects a conductive material formed on the surface of the electric appliance with the virtual ground potential of the virtual ground unit, continuously detecting a leakage current and displaying an alarming signal on a visible display unit and an audible signal display unit.

Other features and advantages will be readily apparent from the following description, the accompanying drawings, and the claims.

DETAILED DESCRIPTION OF THE INVENTION

The leakage current alarming/blocking apparatus using an antiphase transformer according to the present invention will be explained with reference to the accompanying drawings.

In the present invention, a direct current (DC) supply unit is formed by a rectifying circuit using a double insulation transformer, and a virtual ground unit is formed of two resistors which divide the voltage from the secondary side of the antiphase transformer into two voltages forming a common connection point as a virtual ground potential, and a leakage current detector is formed by a resistor, an optical switching unit and a comparing unit.

The optical switching unit is formed by a photo coupler, and the visual signal display unit if the alarming signal generator is formed by a Light Emitting Diode (LED), and an audible signal display unit is formed by a buzzer.

The comparator of the comparing unit is provided for comparing the voltages.

The antiphase transformer according to the present inventions implemented based on "the antiphase transformer" of Ser. No. 97-67993 filed to Korean Industrial Property Office. As the above described antiphase transformer, there is known a 1:1 antiphase transformer and a 1:M antiphase transformer, where M represents the number of coil windings of the secondary side.

Figure 2A:
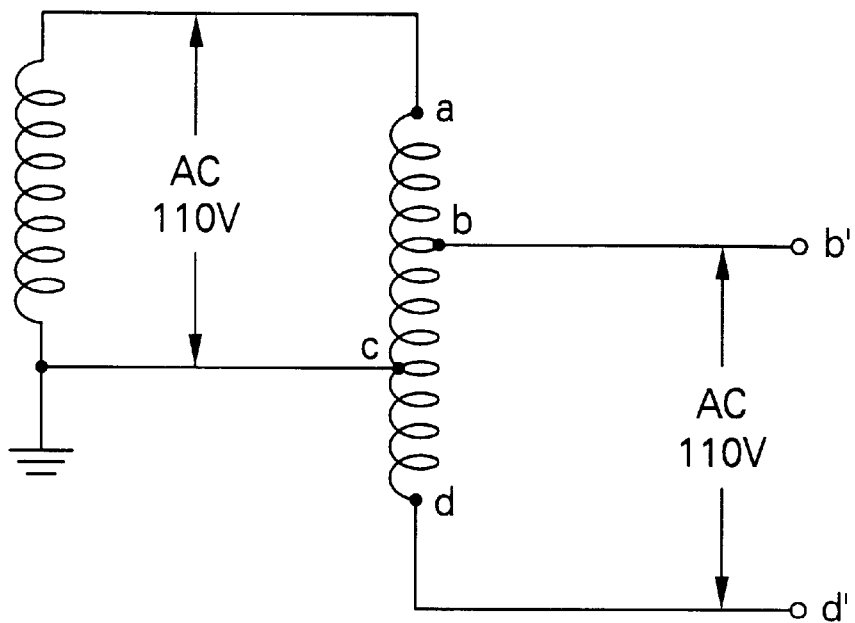
FIG. 2A is a circuit diagram illustrating a construction of an antiphase transformer.

Referring to FIG. 2A, in the 1:1 antiphase transformer, the coil is wound onto the magnetic member by N-times in the identical direction, and a hot line of the primary side is connected with the start point of the coil. A cold line of the primary side is connected with the 2/3 wound portion of the coil. In addition, the electric power of the secondary side is generated from the 1N/3 wound point and the end point of the coil, so that the currents of the secondary side from the 1N/3 wound point and the end point of the coil are antiphased.

Figure 3A:
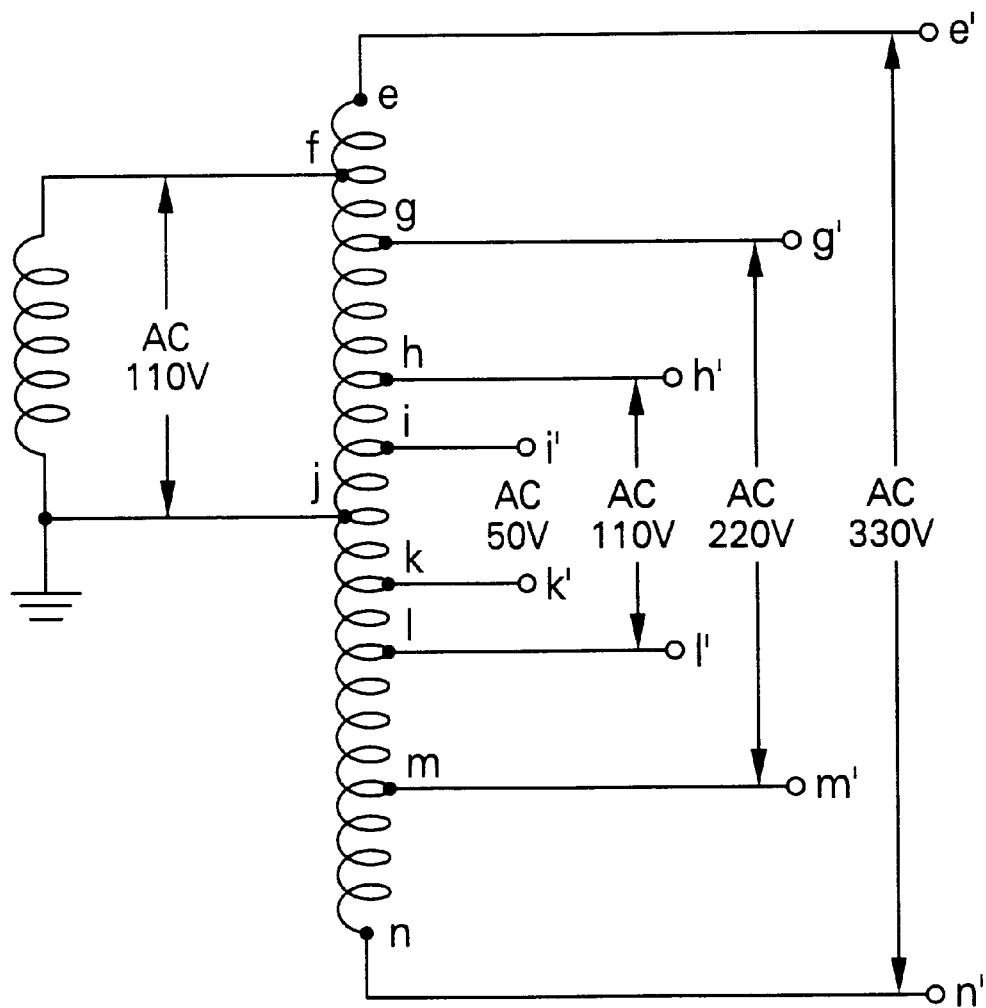
FIG. 3A is a circuit diagram illustrating another construction of an antiphase transformer.

Referring now to FIG. 3A, in the 1:M antiphase transformer, the coil is wound onto the magnetic member N-times in the identical direction, and the hot line and cold line of the primary side are connected with a predetermined portion of the coil. A plurality of contact points are formed in one direction with respect to the contact point of the coil, and the contact points are formed at the portions symmetrical to the contact points in the other direction by the number of coil windings, so that each pair of the contact points symmetrical to each other and having the identical coil windings have different voltages with respect to the contact point of the cold line, and thus a multiple number of secondary side voltages having antiphases are generated.

Here, the cold line represents an electric power line grounded, and the hot line represents an electric power line which is not grounded. Namely, the electric power line extended from the transformer and then grounded before the electric power is supplied to a load circuit installed in a house or factory is called the cold line. The electric power line extended from the transformer and then grounded before the electric power is not supplied to the load circuit is called the hot line.

In addition, the above-described magnetic member is formed of a steel, a nickel, or a cobalt or an alloy of the same or a silicon steel plate having a good frequency characteristic.

In the drawings, reference characters (a and f) represent a hot line contact point of the primary side, (c and J) represent an electric power output tap of the secondary side, (b', d', e', g', h', i', k', l', m' and n') represent an electric power output terminal of the secondary side, and (b", d", e", g", h", i", k", l", m" and n") represent a voltage wave form generated from the output terminals of the secondary side.

In the antiphase transformer, the phases of both terminals from the secondary side are antiphased with respect to the ground potential, and the potential difference of each output terminal is ½ of the potential difference between both output terminals with respect to the ground potential, decreasing the formation of the electric field which is proportional to the level of the voltage.

Figure 1A:
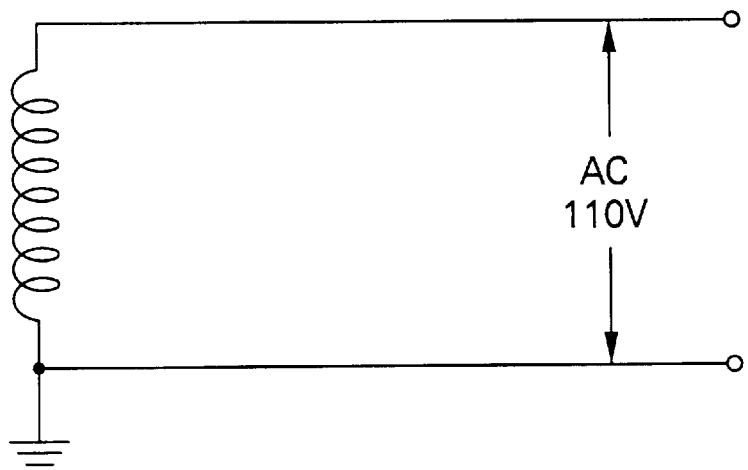
FIG. 1A is a view illustrating a grounded state of a single phase two-line type alternating current (AC)
Figure 1B:
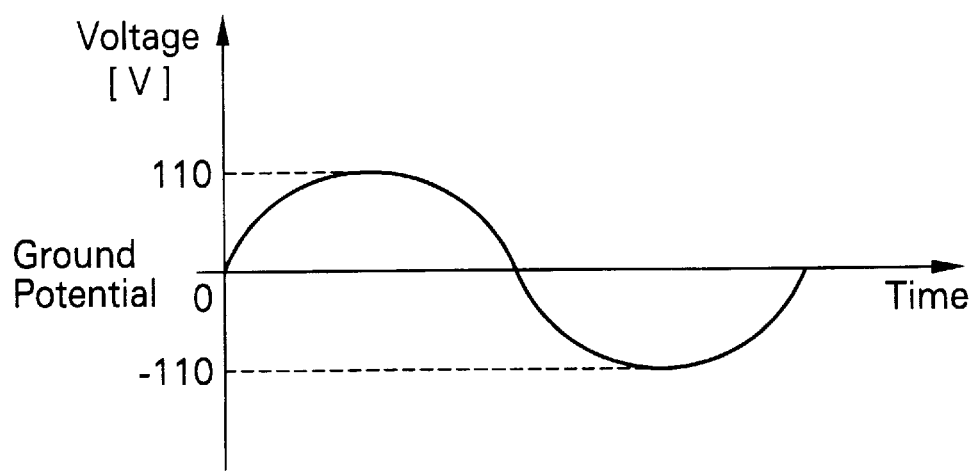
FIG. 1B is a wave form diagram of the AC of FIG. 1A.
Figure 2B:
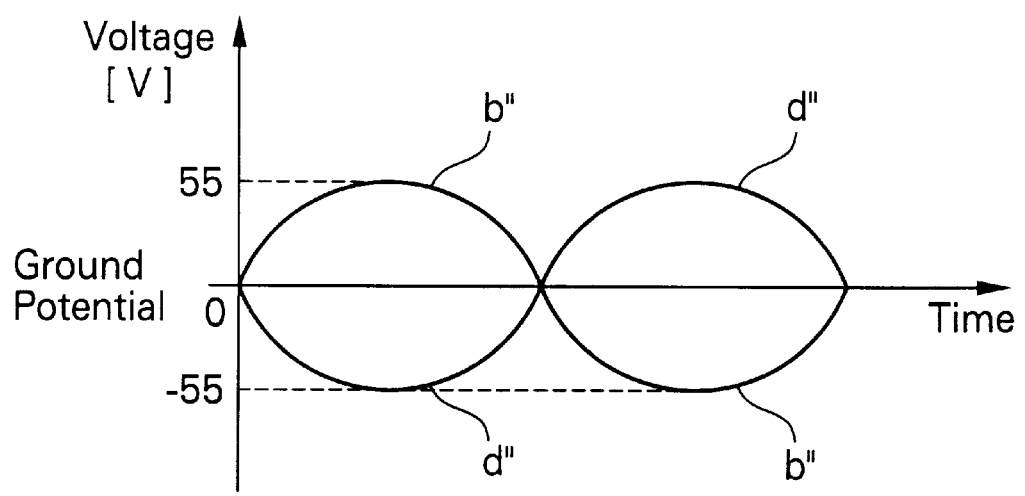
FIG. 2B is a wave form diagram of the AC of a secondary side of the antiphase transformer of FIG. 2A.
Figure 3B:
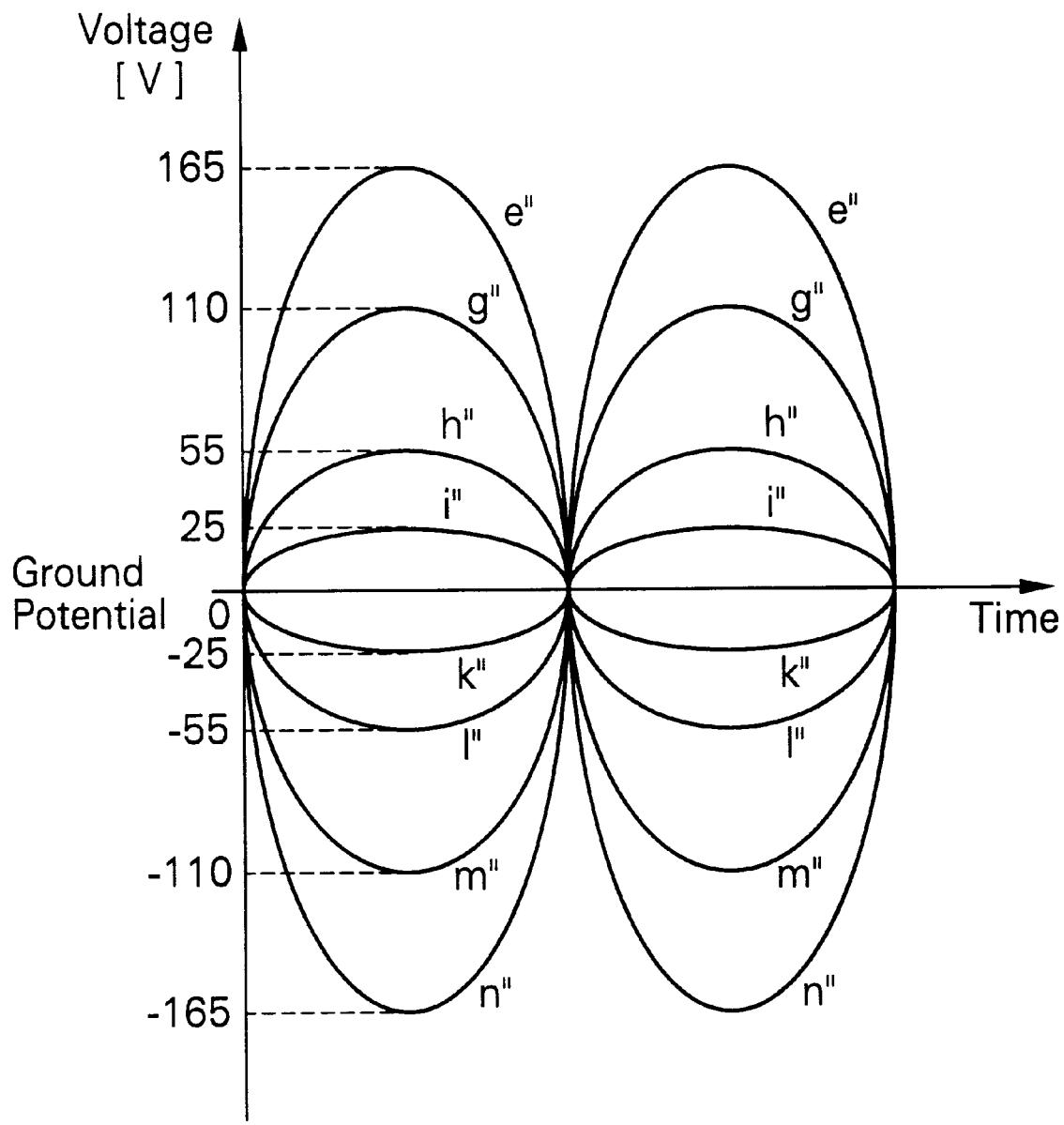
FIG. 3B is a wave form diagram of the AC of a secondary side of the antiphase transformer of FIG. 3A.

Referring now to FIGS. 1A and 1B, when 110 V AC is applied to the primary side, the AC as shown in FIG. 2B is generated in the case of the 1:1 antiphase transformer, and the AC as shown in FIG. 3B is generated in the case of the 1:M antiphase transformer.

As shown in FIGS. 1A and 1B, when the AC having 110 V potential difference is applied to the primary side with respect to the ground potential, the antiphase transformer varies the AC. In the case of the 1:1 antiphase transformer, the AC of (+) 55 V and (−) 55 V are output to each output terminal generating a potential difference of 110V between two output terminals. In the case of the 1:M antiphase transformer, the AC of ½ of the output voltage is output to each output terminal, so that the potential difference between two output terminals becomes a predetermined value decreasing the electric field.

The ½ point (the point at which the coil winding number forming the secondary side current is ½) between the AC output terminals of the secondary side of the antiphase transformer is connected with the ground potential, so that the potential difference between the AC output terminals of the secondary side becomes an operational potential difference of the electric appliance, and the potential difference of the AC output terminal becomes ½ of the operational potential difference decreasing the formation of the electric field as the potential difference is increased.

Figure 4:
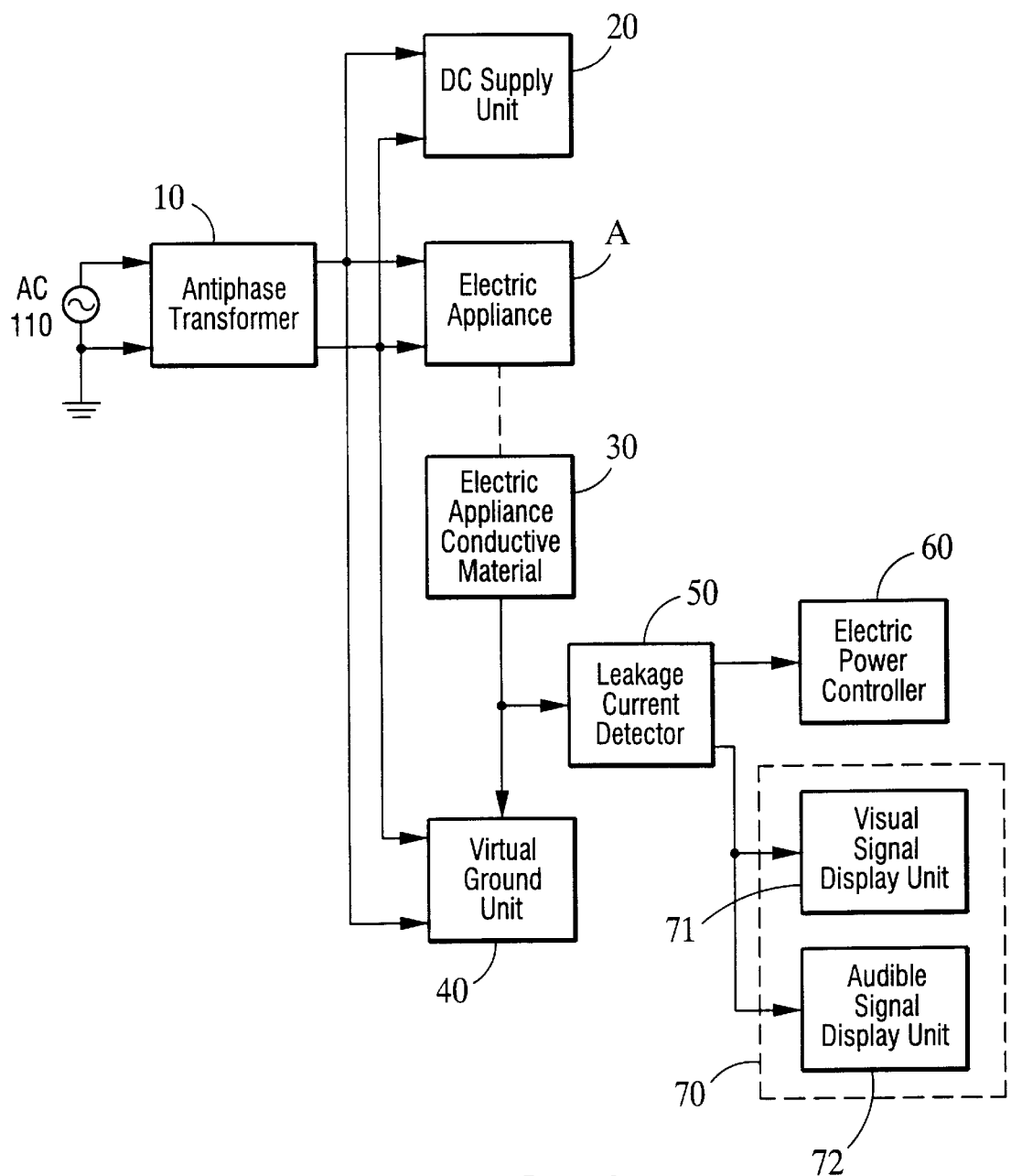
FIG. 4 is a block diagram illustrating a leakage current alarming/blocking apparatus using an antiphase transformer according to a first embodiment of the present invention.

Referring now to FIG. 4, the DC supply unit 20, the electric appliance A, and the virtual ground unit 40 are connected with the output terminal of the antiphase transformer 10, respectively. The virtual ground potential of the virtual ground unit 40 is connected with the electric appliance conductive material 30 formed on the surface of the electric appliance.

The leakage current detector 50 is installed to detect the leakage of current flowing from the electric appliance conductive material 30 at the virtual ground potential of the virtual ground unit 40. The electric power controller 60 and the alarming signal generator 70 are connected with the output terminal of the leakage current detector 50. Visual Signal Display Unit 71 and Audible Signal Display Unit 72 are both connected to the output terminal of Leakage Current Detector 50.

Figure 5:
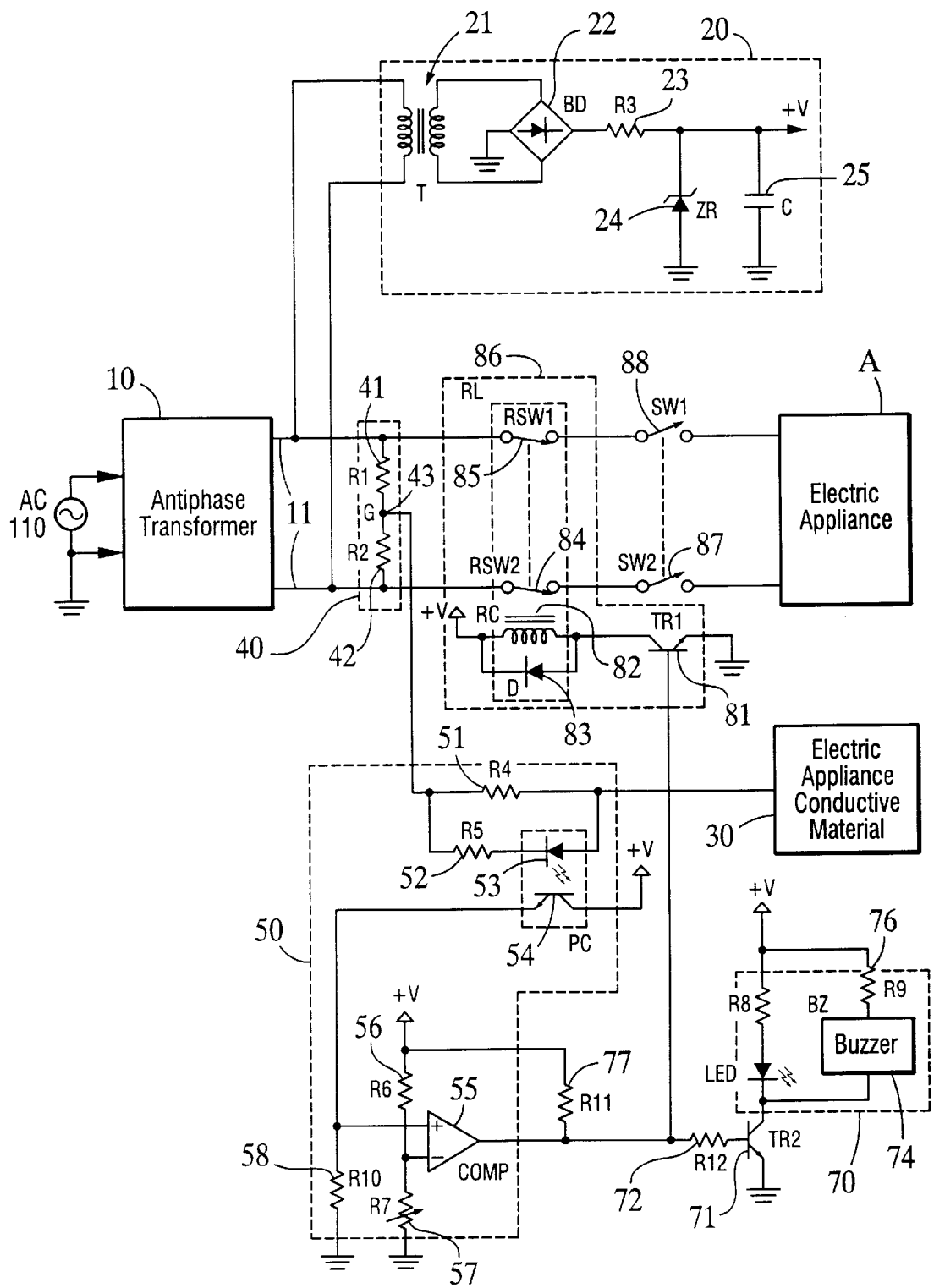
FIG. 5 is a detailed block diagram illustrating a leakage current alarming/blocking apparatus using an antiphase transformer according to a second embodiment of the present invention.

Referring now to FIG. 5, the virtual ground unit 40 is configured by connecting in series the first resistor R1 41 and the second resistor R2 42 having an identical resistance value. The first resistor R1 41 and the second resistor R2 42 are connected in parallel with the output terminal 11 of the secondary side of the antiphase transformer 10. The virtual ground potential G 43 is a common connection point of the first resistor R1 41 and the second resistor R2 42.

In addition, when there is leakage current from the electric appliance conductive material 30, into the leakage current detector 50, the resistor R4 51 forming a potential difference is connected between the electric appliance conductive material 30 and the virtual ground potential G 43 of the virtual ground unit 40, and the LED 53 of the photo coupler PC 54 is connected in parallel with the resistor R4 51 through the protective resistor R5 52. The comparator COMP 55 is connected with the output terminal of the light receiving unit of the photo coupler PC 54. Resistor R10 58 represents an output resistance. Voltage dividing resistors R6 56 and R7 57 connected with the inverted input terminal of the comparator COMP 55. They divide the voltage from the DC supply unit 20 based on a predetermined ratio of the values of the resistors R6 56 and R7 57 and set the divided voltage as a reference value of the comparator COMP 55.

The base terminal of the first switching transistor TR1 81 is connected with the output terminal of the comparator COMP 55, and the relay coil RC 82 is connected so that the relay RL 86 is operated by a switching operation of the first switching transistor TR1 81. The relay switches RSW1 85 and RSW2 84 which are operated by the relay coil RC 82 are connected with both ends of the electric power input line of the electric appliance A, so that the electric power supplied to the electric appliance A is controlled based on the switching operation of the first switching transistor TR1 81. The relay switches RSW1 85 and RSW2 84 are turned on when the relay RL 86 is off, namely, the switching transistor TR1 81 is off, and the diode D 83 is a relay protection diode. SW1 88 and SW2 87 represent a switch controlling the electric power applied to the electric appliance A.

In the alarming signal generator 70, the base terminal of the second switching transistor TR2 71 is connected with the signal output terminal of the comparator COMP 55 through the protection resistor R12 72. The LED 73 which is a visual signal display unit and a buzzer BZ 74 which is an audible signal display unit are connected with the (+) electric power of the DC supply unit 20 through the protection resistors R8 75 and R9 76 in accordance with a switching operation of the second switching transistor TR2 71. Resistor R11 77 represents a pull-up resistance.

The AC of the secondary side of the antiphase transformer 10 is connected with the primary side of the double insulation transformer T 21, and the bridge radio rectifying circuit BD 22, the output resistor R3 23, the zenor diode ZR 24 and the smooth condenser C 25 are sequentially connected with the secondary side forming the DC supply unit 20.

During operation if there is no leakage current from the electric appliance conductive material 30, there will be zero potential difference across the resistor R4 51, and the LED 53 of the photo coupler PC 54 is not activated. Since the light receiving unit of the photo coupler PC 54 is off, the voltage applied to the non-inverted input terminal (+) of the comparator COMP 55 is zero, and the output from the comparator COMP is negative.

Therefore, the first switching transistor TR1 81 and the second switching transistor TR2 71 are turned off, so that the LED 73 and the buzzer BZ 74 are not activated, and the current does not flow through the relay coil RC 82 of the relay RL 86. Since the relay switches RSW1 and RSW2 are not activated, the electric power is applied to the electric appliance A, so that the electric appliance A is normally operated.

However, if there is leakage current from the electric appliance conductive material 30, there will be current flow through the virtual ground potential G 43 of the virtual ground unit 40 through the resistor R4 51, creating a potential difference across the resistor R4 51. In addition, when the potential difference occurs across R4 51, the LED 53 of the photo coupler PC 54 is turned on due to potential difference across R5 52 and LED 53. Voltage proportional to the amount of light from the LED 53 is generated to the output terminal of the light receiving unit of the photo coupler PC 54 and is input into the non-inverted input terminal (+) of the comparator COMP 55.

The comparator COMP 55 compares the voltage from the light receiving unit of the photo coupler PC 54 with a reference value of the inverted input terminal (−) of the comparator COMP 55. If the voltage is greater than the reference value, the voltage (+) is output, and if the voltage is smaller than the same, the voltage (−) is output.

Under normal operation with no leakage current, the voltage from the comparator COMP 55 is a negative voltage (−), as described above.

IF there is a situation where there is leakage current, the voltage from the comparator COMP 55 is a positive voltage (+), and the first switching transistor TR1 81 and the second switching transistor TR2 71 are turned on. As a consequence, the LED 73 and the buzzer BZ 74 are operated, and then the current flows on the relay coil RC 82 of the relay RL 86.

When the current flows on the relay coil RC, the turned-on relay switches RSW1 85 and RSW2 84 are operated and turned off, so that the electric power supplied to the electric appliance A is blocked.

If the leakage current flowing on the electric appliance A conductive material 30 exceeds a reference value set by the resistors R6 56 and R7 57, the user is informed of the leakage of the current through the LED 73 of the visual signal display unit and the buzzer BZ 74 of the audible signal display unit. Furthermore, the electric power being supplied to the electric appliance A through the relay RL 86 is blocked preventing an electric shock to the user.

At this time, the amount of the leakage current by which the electric power controller 60 and the alarming signal generator 70 are operated is controlled by the ratio of the resistors R6 56 and R7 57. Actually, the amount of the leakage current is controlled to be below 1 mA, so that it is possible to prevent the electric shock due to the leakage of the current.

The above-described embodiment of the present invention is implemented by inputting the signal from the photo coupler which is the optical switching unit into the comparator accurately detecting the leakage of the current by connecting an amplifier between the photo coupler and the comparator.

In addition, the operational electric power used for the virtual ground unit, the leakage current detector, the electric power controller and the alarming signal generator is generated using the rectifying circuit provided with the double insulation transformer.

In the above-described embodiment of the present invention, the signal from the leakage current detector is directly applied to the electric power controller and the alarming signal generator driving the same. More preferably, a latch circuit, buffer or a chattering prevention circuit may be connected between the leakage current detector and the alarming signal generator more effectively preventing a malfunction due to the sudden potential variation.

As described above, in the leakage current alarming/blocking apparatus using an antiphase transformer according to the present invention, a virtual ground unit having a ground potential is implemented using the characteristic of the antiphase transformer. The conductive material formed on the surface of the electric appliance is connected with the virtual ground potential of the virtual ground unit, and the leakage current detector continuously detects the leakage of the current. If the current is leaked, the electric power applied to the electric appliance is blocked and at the same time the alarming signal which indicates the leakage of the current is indicated on the visual signal display unit and the audible signal display unit for thereby preventing the electric shock due to the leakage of the current.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A leakage current alarming/blocking apparatus, comprising:
    an antiphase transformer in which the phases of an alternating current from a secondary side of the antiphase transformer is antiphased with respect to a ground potential;
    a virtual ground unit connected with an output terminal of the antiphase transformer for forming a virtual ground potential;
    an electric appliance conductive material formed on a surface of an electric appliance connected with the virtual potential of the virtual ground unit;
    a leakage current detector for repeatedly detecting leakage current from the electric appliance conductive material and outputting a signal indicating leakage current;
    an electric power controller for blocking the supply of the electric power when the signal indicating the leakage of the current is input;
    an alarming signal generator for generating an alarming signal when the signal indicating the leakage of the current is input from the leakage current detector; and
    a direct current supply unit for converting the alternating current into the direct current and applying the direct current to the leakage current detector, the electric power controller, and the alarming signal generator, respectively.

2. The apparatus of claim 1, wherein said virtual ground unit comprises a first resistor and a second resistor which are connected in series, with a common connection terminal between the first resistor and the second resistor, the first resistor and second resistor connected in parallel with an output terminal of a secondary side of an antiphase transformer, the common connection terminal between the first resistor and the second resistor becoming a virtual ground potential having a ground potential.

3. The apparatus of claim 1, wherein said virtual ground unit comprises a first condenser and a second condenser which are connected in series, with a common connection terminal between the first condenser and the second condenser, the first condenser and the second condenser connected in parallel with an output terminal of a secondary side of an antiphase transformer, the common connection terminal between the first condenser and the second condenser becomes a virtual ground potential having a ground potential.

4. The apparatus of claim 1, wherein said leakage current detector comprises:
    a resistor connected between the electric appliance conductive material and the virtual ground unit forming an electric potential when there is leakage current from the electric appliance conductive material; and
    an optical switching means having a light emitting device connected in parallel with the resistor through a protection resistor and a light receiving unit connected with a positive potential from the direct current supply unit for outputting a voltage or a current proportional to the amount of light from the light emitting device when an electric potential difference occurs in the resistor.

5. The apparatus of claim 1, wherein said leakage current detector comprises:
    a resistor connected between the electric appliance conductive material and the virtual ground unit forming an electric potential when there is leakage current from the electric appliance conductive material;
    an optical switching means having a light emitting device connected in parallel with the resistor through a protection resistor and a light receiving unit connected with a positive potential from the direct current supply unit for outputting a voltage or a current proportional to the amount of light from the light emitting device when an electric potential difference occurs in the resistor; and
    a comparing means for comparing a voltage or a current from the optical switching means with a previously set reference value and outputting a predetermined signal when the voltage or current from the optical switching means exceeds the reference value.

6. The apparatus of claim 1, wherein said leakage current detector comprises:
    a resistor connected between the electric appliance conductive material and the virtual ground unit forming an electric potential when there is leakage current from the electric appliance conductive material; and
    an optical switching means having a light emitting device connected in parallel with the resistor through a protection resistor and a light receiving unit connected with a positive potential from the direct current supply unit for outputting a voltage or a current proportional to the amount of light from the light emitting device when an electric potential difference occurs in the resistor; and
    an amplifying means for amplifying the voltage or current from the optical switching means and outputting the same.

7. The apparatus of claim 1, wherein said leakage current detector comprises:
    a resistor connected between the electric appliance conductive material and the virtual ground unit forming an electric potential when there is leakage current from the electric appliance conductive material; and
    an optical switching means having a light emitting device connected in parallel with the resistor through a protection resistor and a light receiving unit connected with a positive potential from the direct current supply unit for outputting a voltage or a current proportional to the amount of light from the light emitting device when an electric potential difference occurs in the resistor;

an amplifying means for amplifying the voltage or current from the optical switching means and outputting the same; and a comparing means for comparing a voltage or a current from the amplifying means with a previously set reference value and outputting a predetermined signal when the voltage or current from the optical switching means exceeds the reference value.

8. The apparatus of claim 1, wherein said electric power controller comprises:

a relay connected with the electric power input terminal of the electric appliance and operated in accordance with a control signal for blocking the supply to the electric appliance; and a switching means operated in accordance with a signal from the leakage current detector for controlling the operation of the relay.

9. The apparatus of claim 1, wherein said alarming signal generator comprises:

a visual signal display unit operated in accordance with a signal from the leakage current detector and displaying the leakage of the current; and an audible signal display unit operated in accordance with a signal from the leakage current detector and indicating the leakage of the current.

10. The apparatus of claim 1, wherein said direct current supply unit is formed of a rectifying circuit using a double insulation transformer.

11. The apparatus of claim 10, wherein said rectifying circuit comprises:

a double insulation transformer;

a bridge radio rectifying circuit connected with a secondary side of the double insulation transformer for rectifying the alternating current;

a zenor diode connected in parallel with a radio signal output terminal of the bridge radio rectifying circuit for limiting the voltage from the bridge radio rectifying circuit below a predetermined value; and a smoothing condenser connected in parallel with the zenor diode for smoothing the voltage from the zenor diode.

12. A method of preventing an electric shock from leakage current from an appliance, comprising:

antiphasing an alternating current from a secondary side of an antiphasing transformer with respect to a ground potential;

forming a virtual ground by connecting a virtual ground; unit in parallel with an output of the antiphasing transformer;

coupling the virtual ground with an electric appliance conductive material;

detecting leakage current from the electric appliance conductive material;

outputting a leakage current signal indicating that there is leakage current;

generating an alarming signal when the leakage current signal is detected;

blocking the supply of electric power when the leakage current signal is detected;

converting the alternating current into a direct current and blocking the supply of electric power.

13. The method of claim 12, further comprising forming an electric potential when there is leakage current from the electric appliance conductive material.

14. The method of claim 12, further comprising generating a light signal proportional to the electric potential in response to the leakage current signal; and converting the light signal to a direct current or voltage proportional to the amount of the generated light.

15. The method of claim 12, further comprising comparing the direct current or voltage with a previously set reference value; and generating a predetermined signal when the direct current or voltage exceeds the reference value.

16. The method of claim 12, further comprising switching off the electric power to an appliance in accordance with the leakage current signal.

17. The method of claim 12, further comprising displaying a visual signal operated in accordance with the leakage current signal.

18. The method of claim 12, further comprising displaying an audible signal operated in accordance with the leakage current signal.

* * * * *